Sept. 16, 1969    A. P. COPPA    3,467,042
METHOD OF MAKING FLEXIBLE CONDUIT
Filed Jan. 4, 1965

INVENTOR
ANTHONY P. COPPA
BY R. H. Quist
ATTORNEY

United States Patent Office 3,467,042
Patented Sept. 16, 1969

---

3,467,042
METHOD OF MAKING FLEXIBLE CONDUIT
Anthony P. Coppa, Merion, Pa., assignor to General Electric Company, a corporation of New York
Filed Jan. 4, 1965, Ser. No. 422,949
Int. Cl. B21d 51/00, 3/00
U.S. Cl. 113—116                                    4 Claims

ABSTRACT OF THE DISCLOSURE

Strong flexible conduit is made by axially compressing a tubular shell, while maintaining sufficient internal pressure in the shell to cause relatively uniform buckling, and then stretching the uniformly buckled shell.

---

This invention relates generally to conduits and more specifically to flexible conduits and a method of making them.

Conduits frequently are mounted in a manner requiring bends rather than being in a simple straight line. For such purposes a conduit which can be bent to the desired curve has advantages over a rigid conduit requiring transition sections. Thin wall conduits have been previously fabricated with circumferential corrugations. Such a corrugated conduit has a greater degree of flexibility than a conduit without such corrugations. The process for forming a corrugated conduit is rather complicated and expensive, usually involving the use of mandrels or dies.

It has previously been discovered that certain thin-walled cylinders when subjected to an axial impact will deform to give a buckled configuration of a repeated diamond-like pattern. This phenomenon has been suggested as a method for absorbing shock such as that produced by air dropping cargo. See for example, "Cushioning for Air Drop," C. W. Morgan and W. L. Moore, Part V, University of Texas, Dec. 20, 1956.

It is an object of this invention to provide a flexible conduit which can be economically manufactured.

In a preferred form of the invention, a cylinder having a mean shell radius to wall thickness ratio greater than 30 is subjected to an axial impact. When the material is one ductile enough to be elongated ten percent without fracturing, it will buckle in a uniform manner. The buckled cylinder is then extended to about two-thirds its original length to form the flexible conduit.

Figure 1:
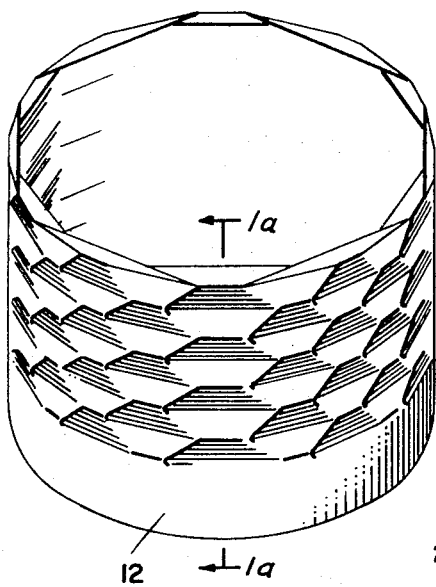
Figure 1A:
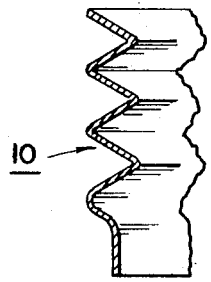
Figure 2:
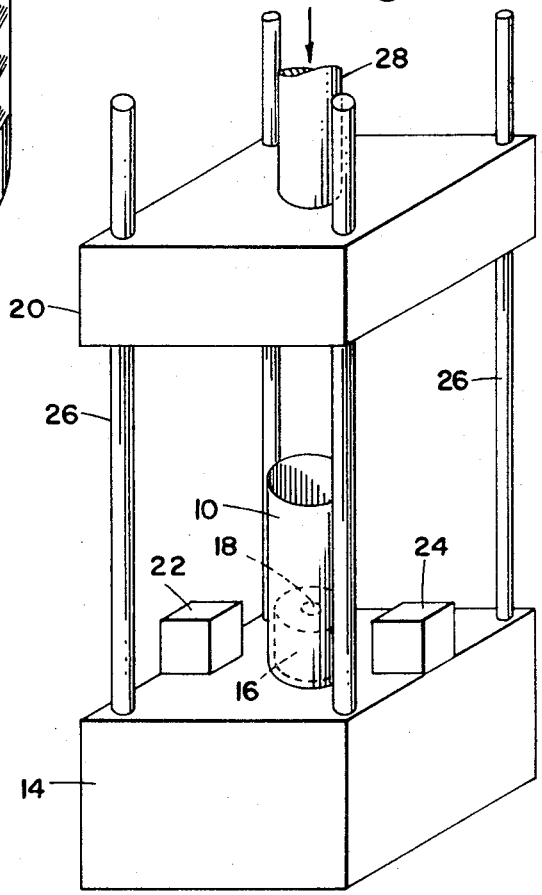
Figure 3:
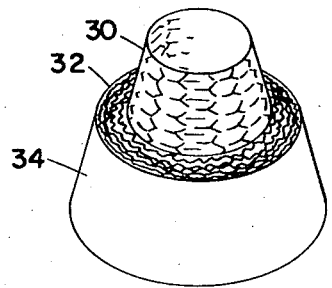

The invention will be better understood from the following description taken in connection with the accompanying drawing in which:

FIGURE 1 is an isometric of a flexible conduit according to the invention;
FIGURE 1a is a section of FIGURE 1;
FIGURE 2 is an oblique projection of a machine used in the fabrication of flexible conduits according to the invention; and
FIGURE 3 is an isometric of a flexible conduit transition section according to the invention.

Referring to FIGURES 1 and 1a, conduit 10 is shown which has been constructed in accordance with this invention. Conduit 10 is characterized by a diamond-like pattern of buckling repeated over the cylindrical body. This deformation of a thin-walled cylinder provides a high degree of flexibility to the cylinder, permitting, for example, one side to be compressed and the opposite elongated to produce a sharp bend.

Conduit 10 can be constructed to have the buckled configuration over its entire length, or, if desired, end portions such as end portion 12 can be provided which retain the original cylindrical form.

In addition to the flexibility imparted by buckling of the cylinder, improved circumferential stiffness is obtained. That is, the buckled cylinder has a greater resistance to loads directed radially towards its longitudinal axis than an unbuckled cylinder of the same dimensions.

Fabrication of the flexible conduit of this invention is uncomplicated once the requirements are established. As shown in FIGURE 2, cylinder 10 is mounted on a sturdy, flate base 14. In this example it is assumed that it is desired to make only the upper portion of cylinder 10 flexible. A cylindrical support 16 having a height equal to the desired uncollapsed height of the cylinder is placed on base 14 within cylinder 10. Support 16 has a diameter slightly less than cylinder 10, and is provided with a central orifice 18. Orifice 18 is designed to permit air to escape at a controlled rate during the collapse of cylinder 10. A hole (not shown) in base 14 communicating with orifice 18 is therefore provided.

Collapse of cylinder 10 is performed by impacting a mass 20 having a flat bottom surface sharply against the top of cylinder 10. To assist in maintaining the bottom portion of cylinder 10 uncollapsed, hard rubber blocks 22 and 24 are placed on base 14 to arrest the downward movement of mass 20.

Guide rods 26 prevent mass 20 from moving laterally, and maintain its orientation horizontal. It is preferred to provide bearings (not shown) to facilitate the movement of mass 20.

Although in the laboratory it has been found convenient to achieve the required momentum of mass 20 by merely dropping it from a suitable height, in a manufacturing operation rod 28 can be actuated in the manner of a punch press, by a pneumatic cylinder, etc.

Experiment has shown that not every cylindrical shell which is collapsed will achieve the diamond-like pattern illustrated in FIGURE 1. Cylindrical shells which are suitable for this purpose have a mean shell radius R to wall thickness $t$ ratio greater than 30. Moreover, the material of which the cylindrical shell is made is important. To obtain uniform buckling, the material must be one ductile enough to be elongated ten percent without fracturing.

During collapse it is evident that the volume within the cylinder rapidly decreases. If the air contained in the cylinder is merely compressed, nonuniform buckling or even rupture may result. On the other hand, if the air in the cylinder is permitted to escape too rapidly, the desired buckling pattern is not achieved. The approximate pressure which should be maintained during collapse is given by:

$$P = 0.6\bar{p}E(t/R)^2$$

where:
$p$ is the desired pressure in lb./in.$^2$,
$E$ is Young's modulus in lb./in.$^2$
$t$ is the shell wall thickness in inches, and
$R$ is the mean radius of the shell in inches.
($t$ and $R$ can be measured in any other units as long as both are the same.)

$\bar{p}$ is a dimensionless term, referred to in the literature as effective pressure, which has a known relationship to buckling characteristics.

Generally, the degree of uniformity of buckling is directly related to $\bar{p}$. Reasonably uniform buckling is attained if $\bar{p}$ is in the range from 0.1 to 2.0. Within this range, higher values may be necessitated by a higher than ordinary incidence rate of imperfections in the material. Usually this incidence rate is high in thin materials and decreases with increasing wall thickness.

The upper value of $p$ is limited by the tensile strength, $\sigma_{ult}$ of the material. Hence $$p_{max.} < \frac{\sigma_{ult}}{k}\left(\frac{t}{R}\right)$$

where $k$ is a safety factor. For instance, the limiting pressures for tubes ($R/t=300$, $k=1.5$) of various materials are in the table.

Limiting values of $p$

| Material: | $p_{max}$, p.s.i. |
|---|---|
| 5052 H-38 Al | 93 |
| 1020 steel (120 Brinell) | 133 |
| 4340 steel (270 Brinell) | 290 |

In carrying out the process of this invention, a cylindrical shell is collapsed while maintaining the internal pressure as prescribed by the formula above. The collapsed shell is then extended to about two-thirds its original length. The extended shell can then be easily bent to the desired shape and joined to other collapsed or buckled cylinders, or to unbuckled straight cylinders.

In some cases a conduit must change in diameter. A transition section which can also be fabricated in accordance with this invention can be made from a conical cylindrical shell by using the same procedure described for the right circular cylinder. FIGURE 3 illustrates the results of such a procedure.

The upper portion 30 of the transition conduit has been extended from the portion 32 achieved by the collapse. An unbuckled area 34 has been retained as with the right circular cylinder of FIGURE 1.

While particular embodiments of flexible conduits and the process for making them according to the invention have been illustrated and described, it will be obvious that changes and modifications can be made without departing from the spirit of the invention and the scope of the appended claims.

What is new and desired to be secured by Letters Patent of the United States is:

1. The process of forming a flexible conduit comprising:
   selecting a cylindrical shell having a mean shell radius to wall thickness ratio greater than 30,
   said cylindrical shell being of a material capable of being elongated 10 percent without fracture,
   mounting of one end of said cylindrical shell on a flat rigid surface,
   impacting a flat rigid surface against the other end of said cylindrical shell to collapse said cylindrical shell, while limiting the escape of air from said shell, and
   extending the thus formed buckled cylindrical shell.

2. The process of forming a flexible conduit comprising:
   selecting a cylindrical shell having a mean shell radius to wall thickness ratio greater than 30,
   said cylindrical shell being of a material capable of being elongated 10 percent without fracture,
   mounting one end of said cylindrical shell on a flat rigid surface,
   impacting a flat rigid surface against the other end of said cylindrical shell to collapse said cylindrical shell,
   maintaining the pressure within said cylindrical shell during collapse at a value of about $p$, where:

$$p = 0.6\bar{p}E(t/R)^2$$

where
   $\bar{p} = 0.1-2$,
   $E$ = elastic modulus of the material of said shell,
   $t/R$ = ratio of thickness to radius of said shell, and
   extending the thus formed buckled cylindrical shell.

3. The process of forming a flexible conduit transition section comprising:
   selecting a conical shell having mean shell radii to wall thickness ratios greater than 30,
   said conical shell being of a material capable of being elongated 10 percent without fracture,
   mounting one end of said shell on a flat rigid surface,
   impacting a flat rigid surface against the other end of said shell to collapse said shell, while limiting the escape of air from said shell, and
   extending the thus formed buckled shell.

4. The process of forming a flexible conduit transition section comprising:
   selecting a conical shell having mean shell radii to wall thickness ratios greater than 30,
   said shell being of a material capable of being elongated 10 percent without fracture,
   mounting one end of said shell on a flat rigid surface,
   impacting a flat rigid surface against the other end of said shell to collapse said shell,
   maintaining the pressure within said shell during collapse at a value of about $p$, where:

$$p = 0.6\bar{p}E(t/R)^2$$

where
   $\bar{p} = 0.1-2$,
   $E$ = elastic modulus of the material of said shell,
   $t/R$ = ratio of thickness to radius of said shell, and
   extending the thus formed buckled shell.

References Cited

UNITED STATES PATENTS

| | | | |
|---|---|---|---|
| 698,164 | 1/1929 | Mallory | 113—116 |
| 2,083,943 | 6/1937 | Clifford | 113—116 |
| 2,807,083 | 9/1957 | Zilliacus et al. | 113—116 |
| 2,870,871 | 1/1957 | Stevinson | 113—116 |
| 2,965,961 | 12/1960 | Schindler et al. | 72—59 |
| 2,987,798 | 6/1961 | Fromont | 72—370 |
| 3,092,896 | 6/1963 | Stinehelfer | 113—116 |
| 3,151,559 | 10/1964 | Schermuly | 72—56 |

RICHARD J. HERBST, Primary Examiner

U.S. Cl. X.R.

72—57, 367